United States Patent Office 2,800,405
Patented July 23, 1957

2,800,405

PROCESS FOR THE STIFFENING OF SLAGS UPON LIQUID METAL BATHS BEFORE POURING OFF THE SAME

Rudolf Rinesch, Linz, Austria, assignor to Vereinigte Oesterreichische Eisen- und Stahlwerke Aktiengesellschaft, Linz, Austria, an Austrian joint-stock company No Drawing. Application January 5, 1955,
Serial No. 480,055

Claims priority, application Austria January 9, 1954

1 Claim. (Cl. 75—24)

This invention relates to a process for the stiffening of slags upon liquid metal baths before pouring off the same.

It is an aim of the metallurgical industry to carry out the pouring off of molten metal masses in such a way that bath and slag are separated. For this purpose either part of the thinly liquid slag is allowed to run off at first and the rest of the slag is cast off with the bath, or— as it is the case in the metallurgical treatment of iron— the thinly liquid slag is converted into a pasty to solid mass which can be held back easily on pouring off the bath. This so-called stiffening of the slag is attained usually by addition of cold, preferably solid substances which act neutrally towards the molten metal mass. In the first place burnt lime is used thereto which enters into reaction with the slag consisting normally of calcium iron oxides and silicates, and thereby forms a pasty mass. Such slags of Thomas steel works are used as fertilizers in consequence of their contents of phosphorus, while the manganese slag resulting from the Siemens Martin process or from blowing oxygen upon steel is used as mixture in the blast furnace process for the production of Thomas iron because of its high manganese contents.

With these mentioned processes it cannot be avoided that by addition of lime to the liquid slag its contents of phosphorus or manganese is reduced according to the quantity of the added lime and its value is diminished therefore.

By the invention these disadvantages are removed. The invention consists in cooling down the liquid slag by addition of congealed slag of the same or approximately the same chemical composition which originates for example from the same process of some charges before. By the same chemical composition no additional chemical reactions arise which could influence the quality of the metal bath somewhat in a bad way. Moreover, the quality of the slag remains unchanged by omitting the addition of lime which serves as diluting agent, i. e. the rates percent of phosphorus and manganese existing in the slag are practically maintained. The slags resulting from the process according to the invention therefore show forth especially high phosphorus or, respectively, manganese contents and therefore can be considered as especially precious by-products according to the above explanations.

Apart from this great advantage that concentrated slags result the invention represents a further advantage. Namely, the supply of the very remarkable quantities of lime from often distant lime works is saved, furthermore, transport which has to be carried out hermetrically closed because of the easy absorption of water by the lime, and storing are saved, as well as trouble because of the low suitability of lime for storing. The slag to be added according to the invention, on the contrary, is available in unlimited quantity in each steel works.

Having thus described my invention I am aware that numerous and extensive departures may be made therefrom, without departing from the spirit or scope of the invention.

I claim:

A process for controlling the fluidity of molten slag on molten metal bath to facilitate separation of the metal from the slag during pouring of the molten metal comprising adding to the molten slag on the molten metal bath congealed slag of substantially the same chemical composition as the molten slag to cool and stiffen the molten slag.

References Cited in the file of this patent
UNITED STATES PATENTS

| | | |
|---|---|---|
| 837,598 | Weaver et al. | Dec. 4, 1904 |
| 1,527,536 | Byrnes | Feb. 24, 1925 |

OTHER REFERENCES

"Handbook of Cupola Operation," published by American Foundrymen's Assn., page 333 relied on.